Figure 1:
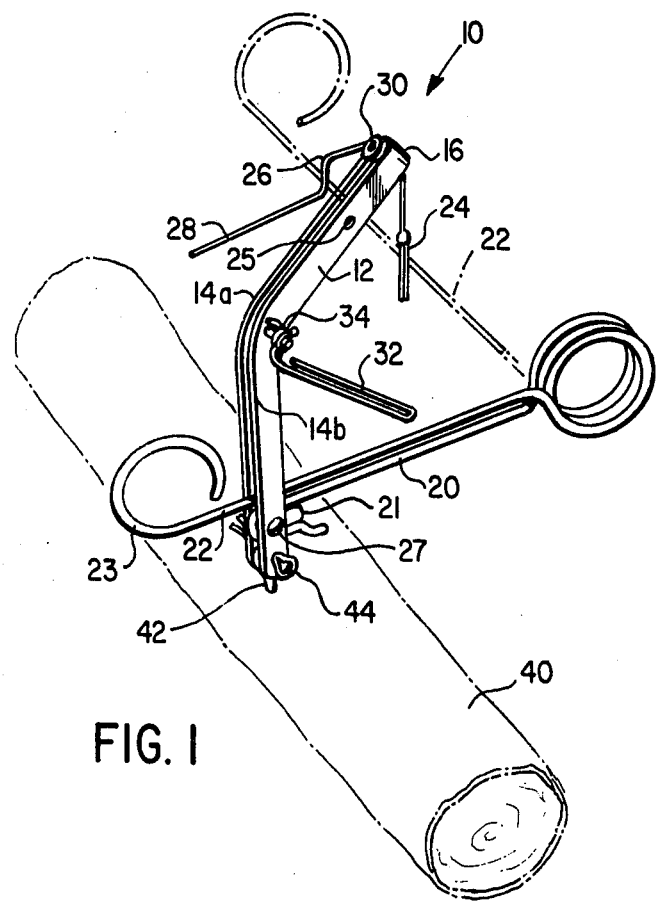

United States Patent [19]

Thébeau

[11] Patent Number: 4,471,559
[45] Date of Patent: Sep. 18, 1984

[54] HUMANE ANIMAL TRAP

[75] Inventor: Vital J. Thébeau, Nackawic, Canada

[73] Assignee: Canadian Patents & Development Limited, Ottawa, Canada

[21] Appl. No.: 421,795

[22] Filed: Sep. 23, 1982

[51] Int. Cl.³ ............................................. A01M 23/24
[52] U.S. Cl. .......................................... 43/81; 43/81.5; 43/85
[58] Field of Search ....................... 43/81, 85, 82, 81.5

[56] References Cited

U.S. PATENT DOCUMENTS

| | | | |
|---|---|---|---|
| 293,683 | 2/1884 | Symonds | 43/81 |
| 940,877 | 11/1909 | Janke | 43/85 |
| 1,303,547 | 5/1919 | Ellison | 43/85 |
| 1,445,892 | 2/1923 | Kovatch | 43/85 |
| 1,455,131 | 5/1923 | Ziola | 43/81 |
| 1,568,688 | 1/1926 | Nord | 43/85 |
| 3,534,493 | 10/1970 | Dahlgren | 43/85 |
| 3,757,457 | 9/1973 | Martin | 43/82 |
| 3,990,174 | 11/1976 | Sallis | 43/85 |
| 4,255,892 | 3/1981 | Thébeau | 43/81 |
| 4,279,093 | 7/1981 | Iddings | 43/85 |
| 4,300,305 | 11/1981 | King | 43/85 |

Primary Examiner—Nicholas P. Godici
Assistant Examiner—M. Jordan
Attorney, Agent, or Firm—Robert G. Hendry

[57] ABSTRACT

A humane animal trap including a coil spring mounted on a frame and having its ends adapted to be spread apart when the trap is set. One end of the spring is held by a latch pivotally mounted for sideways movement on the frame. This latch is shaped so that, in order to hold the spring, it must be held by one end of a trigger which is mounted for vertical swinging movement on the frame. When the trigger is struck by an animal, it swings upwardly thus disengaging the latch and causing the one end of the spring to move downwardly towards the other end of the spring.

1 Claim, 2 Drawing Figures

HUMANE ANIMAL TRAP

This invention relates to animal traps and, more particularly, to a humane animal trap capable of striking a killing blow to an animal attempting to pass through the trap.

Traps are now being designed to strike a killing blow to the neck or back of the animal rather than grasping the leg of the animal thereby causing a slow death.

These prior devices suffer from various deficiencies including malfunction in extremely cold weather due to freezing of the trigger mechanism.

This invention is an improvement in the trap described and claimed in my prior U.S. Pat. No. 4,255,892.

It is, therefore, an object of the present invention to provide a more reliable and weatherproof trigger mechanism.

A further object of the present invention is the provision of a mount to secure the trap to a tree branch so that the trap and the animal caught therein will move to one side when the trap is activated so as not to prevent other animals from reaching other traps on the runway.

A still further object of this invention is the provision of a trap having a trigger adapted to swing upwardly when struck by the animal.

Accordingly, the present invention provides a humane animal trap comprising anchor means, an upstanding frame member secured to said anchor means, a coil spring having its ends extending outwardly to form an anvil bar and a striker bar, a latch pivoted on an upper portion of said frame adapted to engage said striker bar when said bars are spread apart, and a trigger adapted to retain said striker bar in engagement with said latch, whereby pivoted movement of said trigger causes said trigger to disengage said latch so as to free the latch from the striker bar which then moves downwardly towards the anvil bar.

Figure 2:
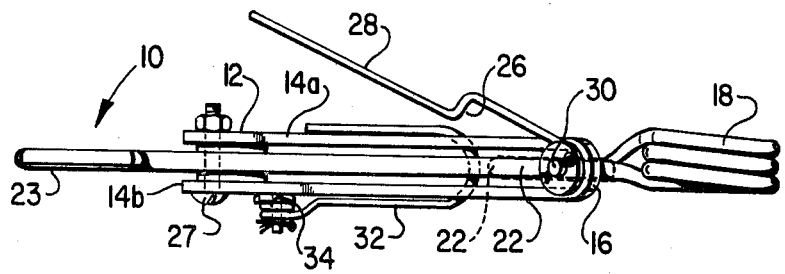

In the drawings, which illustrate an embodiment of the invention,

FIG. 1 is a perspective view of a trap in accordance with this invention in the closed or sprung position; and FIG. 2 is a top plan view of the trap of FIG. 1.

Referring now in detail to the drawings, a trap shown generally at 10 in FIG. 1, includes a frame 12. The frame 12 is made up of two parallel members 14a and 14b. the frame 12 may be formed of a single strip of sheet metal bent back on itself at 16. Fixed between the members 14a and 14b is a coil spring 18 having one of its ends 20 fixed thereto so as to form the anvil bar. The end 20 of the coil spring 18 is bent back around a block 21 received between the frame members 14a and 14b, and welded to one of the frame members. A bolt 27 extending through the frame member 14a, 14b, and the block 21, holds the frame members against the block 21. The other end 22 of the spring 18 forms the striker bar. The striker bar 22 terminates in a loop 23 for the convenience of the user in setting the trap 10. The loop 23 also increases the mass of the striker bar 22 thereby increasing the stricking force of the striker bar 22. The single spring 18 is capable of providing a striking force of between 200 and 350 inch pounds and a clamping force of about 20 pounds when open approximately 1 inch.

The striker bar 22 may be held initially in the raised position, as shown in dotted lines, by a cotter pin 24 received in a hole 25 in the frame. In use, however, the striker bar 22 is held by a bent portion 26 of the latch 28 mounted on the frame 12 as by a bolt 30 extending through the frame 12. The latch 28 is adapted to swing sideways. A trigger 32 is pivotally mounted on the side of the frame 12 by means of a pin 34 welded to the frame and a cotter pin 35 extending through the end of the pin 34. When the trap is set, a free end of the latch 28 is engaged by the end of the trigger 32 to prevent sideways swinging movement.

In use, the trap 10 is secured to a tree limb shown at 40 by a screw eye 42 which is pivotally fastened to the frame 12 as by a bolt or cotter pin 44 extending therethrough and through the frame 12.

The cotter pin 24 is withdrawn prior to actual use of the trap so that only the latch 28 and trigger 32 will hold the striker bar 22 in the raised position.

When the trap is sprung by a squirrel, it can rotate away from the limb so as not to interfere with the passage of other squirrels on the limb 40 if a plurality of traps 10 have been set on the same runway.

I claim:

1. A humane animal trap comprising anchor means, at least one upstanding frame member secured to said anchor means, a coil spring having its ends extending outwardly to form an anvil bar and a striker bar, a latch pivotally mounted on an upper portion of said frame for sideways movement and adapted to engage said striker bar when said bars are spread apart and a trigger pivotally mounted on a side of said frame whereby pivotal upward movement of said trigger causes its end to disengage said latch thereby, allowing said latch to swing sideways and release said striker bar.

* * * * *